(12) United States Patent
Anderson

(10) Patent No.: US 11,275,365 B2
(45) Date of Patent: Mar. 15, 2022

(54) INTEGRATION OF ONLINE AND OFFLINE CONTROL VALVE DATA

(71) Applicant: FISHER CONTROLS INTERNATIONAL LLC, Marshalltown, IA (US)

(72) Inventor: Shawn W. Anderson, Haverhill, IA (US)

(73) Assignee: FISHER CONTROLS INTERNATIONAL LLC, Marshalltown, IA (US)

(*) Notice: Subject to any disclaimer, the term of this patent is extended or adjusted under 35 U.S.C. 154(b) by 756 days.

(21) Appl. No.: 15/454,800

(22) Filed: Mar. 9, 2017

(65) Prior Publication Data
US 2018/0113446 A1    Apr. 26, 2018

Related U.S. Application Data

(60) Provisional application No. 62/412,204, filed on Oct. 24, 2016.

(51) Int. Cl.
*G05B 23/02* (2006.01)
*F16K 37/00* (2006.01)
(Continued)

(52) U.S. Cl.
CPC ......... *G05B 23/0208* (2013.01); *F16K 31/12* (2013.01); *F16K 37/0083* (2013.01); *G05B 23/0235* (2013.01); *G05B 23/0283* (2013.01); *G05D 7/0635* (2013.01); *G05D 16/20* (2013.01); *F15B 19/005* (2013.01); *F15B 2211/6313* (2013.01); *F15B 2211/6336* (2013.01); *F15B 2211/855* (2013.01); *F15B 2211/857* (2013.01); *G05B 19/0425* (2013.01); *G05B 2219/24077* (2013.01); *G05B 2219/33326* (2013.01); *G05B 2219/33331* (2013.01); *G05B 2219/45006* (2013.01)

(58) Field of Classification Search
CPC .................................................. G05B 23/0208
See application file for complete search history.

(56) References Cited

U.S. PATENT DOCUMENTS 5,966,679 A    10/1999    Snowbarger et al.
7,478,012 B2    1/2009    Tewes et al.
(Continued)

FOREIGN PATENT DOCUMENTS

EP    0 315 391 A2    5/1989
RU    2420778 C2    6/2011
(Continued)

OTHER PUBLICATIONS

Office Action, GCC Patent Application No. 2017-34142, dated Jun. 25, 2019.
(Continued)

*Primary Examiner* — Hyun D Park
(74) *Attorney, Agent, or Firm* — Marshall, Gerstein & Borun LLP

(57) ABSTRACT

An integrated diagnostics system utilizes online and offline diagnostics techniques to evaluate control valves found in process plant environments. The integrated diagnostics system improves on existing diagnostic systems, which typically rely exclusively on online diagnostics or offline diagnostics.

18 Claims, 6 Drawing Sheets

(51) Int. Cl.
*F16K 31/12* (2006.01)
*G05D 16/20* (2006.01)
*G05D 7/06* (2006.01)
*G05B 19/042* (2006.01)
*F15B 19/00* (2006.01)

(56) References Cited

U.S. PATENT DOCUMENTS

| | | | |
|---|---|---|---|
| 2008/0004836 A1* | 1/2008 | Tewes | G05B 23/0232 702/182 |
| 2009/0222124 A1* | 9/2009 | Latwesen | F16K 37/0083 700/110 |
| 2010/0141596 A1* | 6/2010 | Junk | G05B 19/042 345/173 |
| 2013/0327403 A1 | 12/2013 | Jensen | |
| 2014/0069508 A1 | 3/2014 | Minervini | |
| 2015/0276086 A1 | 10/2015 | Wheeler et al. | |

FOREIGN PATENT DOCUMENTS

| | | |
|---|---|---|
| RU | 2483340 C2 | 5/2013 |
| RU | 2542663 C2 | 2/2015 |
| WO | WO-2011135155 A1 | 11/2011 |

OTHER PUBLICATIONS

International Search Report for Application No. PCT/US2017/057073, dated Jan. 26, 2018.
Written Opinion for Application No. PCT/US2017/057073, dated Jan. 26, 2018.
Office Action, Russian Patent Application No. 2019114437, dated Oct. 28, 2020.
Search Report for Russian Patent Applicatoin No. 2019114437, dated Oct. 28, 2020.
Office Action, Russian Patent Application No. 2019114437, dated Feb. 10, 2021.
Office Action, European patent application No. 17794474.1, dated May 6, 2021.

* cited by examiner

INTEGRATION OF ONLINE AND OFFLINE CONTROL VALVE DATA

CROSS-REFERENCE TO RELATED APPLICATION

This application claims priority to U.S. Provisional Patent Application No. 62/412,204, filed on Oct. 24, 2016, and titled "Integration of Online and Offline Control Valve Data," the entire disclosure of which is hereby expressly incorporated by reference herein.

TECHNICAL FIELD

The present disclosure generally relates to diagnostics for control valves, and, in particular, to integrated diagnostics systems and methods that incorporate online and offline diagnostics to evaluate control valves.

BACKGROUND

Process control systems, such as those used in chemical, petroleum or other process plants, typically include one or more process controllers communicatively coupled to at least one host or operator workstation and to one or more field devices via analog, digital, or combined analog/digital communication links.

The process controllers receive signals indicative of process measurements made by sensors and/or field devices and/or other information pertaining to the field devices and execute a controller application that runs, for example, different control modules that make process control decisions, generate control signals based on the received information and coordinate with the control modules or blocks being performed in the field devices, such as HART®, Wireless HART®, and FOUNDATION® Fieldbus field devices. The control modules in the controller send the control signals over the communication lines or links to the field devices to thereby control the operation of at least a portion of the process plant or system.

The field devices, which may be, for example, valves, valve positioners, switches, and transmitters (e.g., temperature, pressure, level and flow rate sensors), are located within the process environment and generally perform physical or process control functions such as opening or closing valves, measuring process parameters, etc. to control one or more process executing within the process plant or system. Smart field devices, such as field devices conforming to the well-known Fieldbus protocol may also perform control calculations, alarming functions, and other control functions commonly implemented within the controller.

Information from the field devices and the controller is usually made available over a data highway to one or more other hardware devices, such as operator workstations, personal computers or computing devices, data historians, report generators, centralized databases, or other centralized administrative computing devices that are typically placed in control rooms or other locations away from the harsher plant environment. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers and field devices may include a wired communication path, a wireless communication path, or a combination of wired and wireless communication paths.

A particular set of process control devices used to achieve a particular control objective (e.g., controlling an inlet valve to a tank based on one or more measured process parameters) may be referred to as a process control loop. Furthermore, each valve or other device may, in turn, include an inner loop wherein, for example, a valve positioner controls a valve actuator (which may be electric, pneumatic, or hydraulic in nature) to move a control element, such as a valve plug, in response to a control signal and obtains feedback from a sensor, such as a position sensor, to control movement of the valve plug. This inner loop is sometimes called a servo loop.

In the case of a hydraulic valve actuator, the control element may move in response to changing fluid pressure on an actuator such as a spring biased diaphragm, which may be caused by a valve positioner responding to a change in the command signal. For example, in one standard valve mechanism, a command signal with a magnitude varying in the range of 4 to 20 mA (milliamperes) causes the valve positioner to alter the amount of fluid and thus, the fluid pressure, within a pressure chamber in proportion to the magnitude of the command signal. Changing fluid pressure in the pressure chamber causes the actuator (i.e., the spring based diaphragm in this example) to move, which causes the control element (e.g., a valve plug) to move. Accurate and precise control depends on a known relationship between (i) a change in pressure exerted on the control element and (ii) the resulting travel of the control element (sometimes simply referred to as travel of the valve).

In some cases, the relationship between supplied pressure and control element travel changes due to wear and tear on the valve, changes in process conditions (e.g., temperature or pressure of material flowing through the valve itself), changes in atmospheric conditions, etc. In some circumstances, the relationship between supplied pressure and control element travel is dynamic over time, and thus must consistently be reevaluated to maintain high performance control.

Generally speaking, valves can be diagnosed using offline diagnostics or online data. Performing offline diagnostics typically involves stroking the valve through its entire range of travel while collecting diagnostics data (e.g., data indicative of the relationship between the supplied pressure and the travel of the valve). While offline diagnostics often provide a comprehensive picture of the overall behavior of a valve, these diagnostics may fail to capture valve behavior similar to what would be found in a commissioned, operating valve. This failure to capture "real world" valve behavior can be attributed to the fact that the conditions may vary greatly from on-line to off-line operation due to extreme temperature, pressure, or other conditions. Rather than moving in a manner similar to what one would expect to see in the field, the valve is typically taken through a full range of travel at a standardized, slow, and methodical pace. While this slow pace removes various dynamics from valve behavior and makes it easier to compare the valve to other similar valves for the purpose of identifying valve health metrics, it is not always helpful by itself in determining whether the health of an operating valve has deteriorated over time.

Moreover, even if offline diagnostics more closely captured valve behavior similar to that expected in online operation, offline diagnostics require that the valve be taken out of service because it is not likely that the valve can be taken through a full range of travel while simultaneously maintaining control of a process. Consequently, the process must often be halted for offline diagnostic testing of a valve, which can be costly in terms of lost material and profit. As a result, offline diagnostics testing is infrequent, and control valves often go years without updating offline diagnostics, resulting in a situation where offline diagnostics results, which may be years old, fail to account for break-in and normal wear and tear.

Online diagnostics are typically considered less invasive than offline diagnostics, as online diagnostics can be utilized in-situ (i.e., while the valve is in service). In short, during online diagnostics, the valve operates in normal operating condition while diagnostics data is collected. This has an advantage of not only maintaining normal operation of the valve and process while diagnostics data is collected, but also of accounting for the effect process conditions (e.g., temperature, pressure, etc.) have on the performance of the valve. Unfortunately, online diagnostic methods may also provide limited benefits. Because diagnostics data is only collected during normal online operation, online diagnostics methods may fail to capture diagnostics data pertaining to rare or unexpected conditions. For example, many valves have a limited (e.g., 40%-60%) travel range during typical operation. As a result, online diagnostics may fail to capture diagnostics data regarding how the valve would respond to a command to adjust the valve to a position outside of this limited range.

SUMMARY

An integrated diagnostics system utilizes online and offline diagnostics techniques to evaluate control valves found in process plant environments. In some instances, embodiments of the integrated diagnostics system may utilize prognostics, predictive analytics, and/or other suitable analytics techniques. The integrated diagnostics system improves on existing diagnostic systems, which typically rely exclusively on online diagnostics or offline diagnostics.

In an embodiment, a method comprises any one or more of the following: (i) receiving, by one or more processors, offline diagnostics data for a control valve, the offline diagnostics data describing a response of the control valve to a first control signal for a first range of travel when the control valve is not in service in a process plant; (ii) receiving, by the one or more processors, online diagnostics data for the control valve, the online diagnostics data describing a response of the control valve to a second control signal for a second range of travel when the control valve is in service in the process plant; (iii) using the offline diagnostics data and the online diagnostics data, generating a diagnostic metric indicative of at least one operational parameter of the control valve, by the one or more processors; and/or (iv) in response to determining that the diagnostic metric exceeds a threshold value, generating an indication to be provided to an operator via a user interface.

In an embodiment, a system comprises any one or more of the following: a control valve in a process plant; a plurality of sensors configured to monitor the control valve; and/or an integrated diagnostics system, which may be communicatively connected to the plurality of sensors. The integrated diagnostics system may be configured to do any one or more of the following: (i) receive, via the plurality of sensors, offline diagnostics data for the control valve, the offline diagnostics data describing a response of the control valve to a first control signal for a first range of travel when the control valve is not in service in the process plant; (ii) receive, via the plurality of sensors, online diagnostics data for the control valve, the online diagnostics data describing a response of the control valve to a second control signal for a second range of travel when the control valve is in service in the process plant; (iii) generate, using the offline diagnostics data and the online diagnostics data, a diagnostic metric indicative of at least one operational parameter of the control valve; and/or (iv) generate, in response to determining that the diagnostic metric exceeds a threshold value, an indication to be provided to an operator via a user interface.

In an embodiment, a method comprises any one or more of the following: (i) initiating an offline diagnostics procedure on a control valve in a process plant, wherein the control valve is controlled through a range of travel; (ii) collecting, during the offline diagnostics procedure, offline diagnostics data from a plurality of sensors monitoring the control valve; (iii) calculating an offline response of the control valve utilizing the offline diagnostics data; (iv) collecting, during online operation of the control valve, online diagnostics data from the plurality of sensors monitoring the control valve; (v) calculating a plurality of online responses for the control valve utilizing the online diagnostics data; (vi) for each of the plurality of online responses, calculating a value for a response ratio relating the offline response to one of the plurality of online responses; (vii) analyzing the values of the response ratio to determine a rate of change for the response ratio over time; and/or (viii) generating an indication to be provided to an operator via a user interface when the rate of change for the response ratio exceeds a threshold.

BRIEF DESCRIPTION OF THE DRAWINGS

Each of the figures described below depicts one or more aspects of the disclosed system(s) and/or method(s), according to an embodiment. Wherever possible, the Detailed Description refers to the reference numerals included in the following figures.

DETAILED DESCRIPTION

Figure 1:
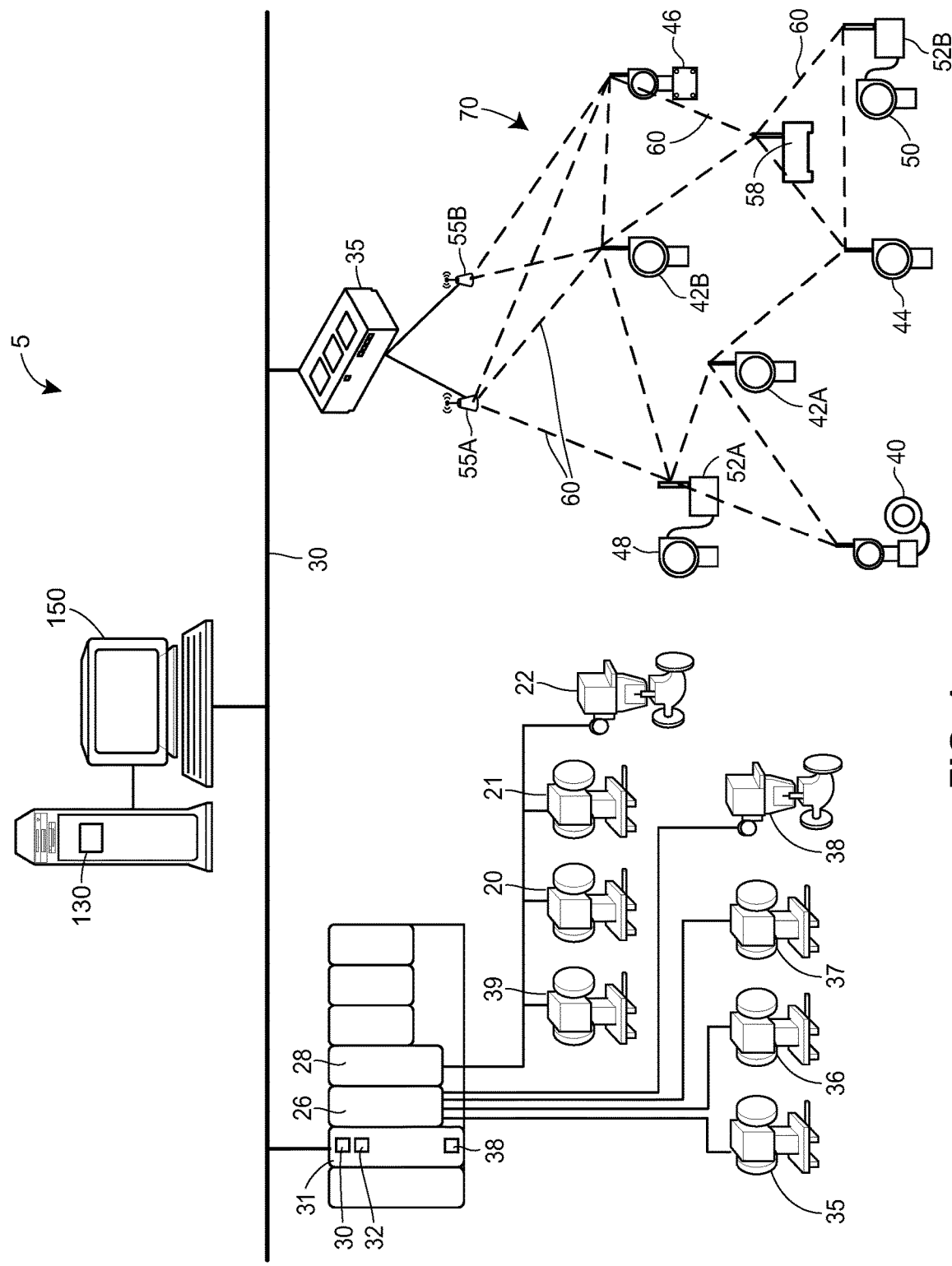
FIG. 1 is a block diagram depicting an example process plant in which an integrated diagnostics system may be implemented to diagnose and analyze one or more control valves.

Generally speaking, an integrated diagnostics system of this disclosure utilizes online and offline diagnostics data to evaluate parameters of a control valve operating in a process plant environment. Rather than relying exclusively on online diagnostics or offline diagnostics, the integrated diagnostics system uses both types of data to more accurately detect such issues as deteriorating valve health, in a wider range of cases. Moreover, the integrated diagnostics system operates in a non-intrusive manner and generally does not require that a valve be taken offline for testing.

For example, for a certain control valve the integrated diagnostics system can determine an offline "signature" (a characteristic response of a process variable to a control signal) and one or more online signatures, each of which may correspond to a full range of travel or a part of the range of travel. The integrated diagnostics system can collect online operating data for the control valve and compare the collected online operating data to the offline and online signatures. The integrated diagnostics system can select a diagnostic metric and compare current values for the diagnostic metric to those found in the online and offline signature. Examples of such metrics include the time required to move a valve a given amount in response to a given pressure, the rate at which valve changes for a given increase in pressure, etc.

Advantageously, the integrated diagnostics system can reduce the number of false positives that the existing diagnostics systems relying exclusively on online or offline diagnostics techniques are prone to generate. Because the integrated diagnostics system can establish a baseline with an offline signature and also tracks recent behavior with an online signature, the integrated diagnostics system can establish a range of behavior that might be expected for a wide variety of circumstances. For example, a system relying only on online diagnostics may generate a false positive regarding the health of the valve when the valve is operated outside of its normal routine (e.g., opening or closing the valve to an atypical position at an atypical rate) simply because the system has little diagnostics data describing behavior of the valve outside of normal behavior. By contrast, the integrated diagnostics system can compare the behavior of the valve to an offline signature to more accurately determine whether the behavior of the valve represents a problem.

Below, section I describes, referencing FIG. 1, an example plant environment in which the integrated diagnostics system can be implemented. Section II describes, referencing FIG. 2, an example control valve that may be diagnosed and analyzed by an integrated diagnostics system. Section III describes, referencing FIG. 3, an example valve controller that can implement diagnostics functions of an integrated diagnostics system. Referencing FIGS. 4 and 5, section IV describes example plots that may be generated and analyzed by an integrated diagnostics system. Section V describes, referencing FIG. 6, an example method of performing an integrated diagnostics analysis. Finally, Section VI includes additional remarks.

I. An Example Plant Environment in which an Integrated Diagnostics System May be Implemented FIG. 1 is a block diagram depicting an integrated diagnostics system 130 that may be implemented to diagnose and analyze one or more control valves in a process plant 5 (sometimes referred to as a "process control system" or "process control environment"). The process plant 5 is described below, followed by a description of the integrated diagnostics system 130.

The process plant 5 includes one or more process controllers that receive signals indicative of process measurements made by field devices, process this information to implement a control routine, and generate control signals that are sent over wired or wireless process control communication links or networks to other field devices to control the operation of a process in the plant 5. Typically, at least one field device performs a physical function (e.g., opening or closing a valve, increasing or decreasing a temperature, taking a measurement, sensing a condition, etc.) to control the operation of a process. Some types of field devices communicate with controllers by using I/O devices. Process controllers, field devices, and I/O devices may be wired or wireless, and any number and combination of wired and wireless process controllers, field devices and I/O devices may be included in the process plant environment or system 5.

For example, FIG. 1 illustrates a process controller 11 that is communicatively connected to wired field devices 15-22 via input/output (I/O) cards 26 and 28, and that is communicatively connected to wireless field devices 40-46 via a wireless gateway 35 and a process control data highway or backbone 10. One or more of the field devices 15-22 and 40-46 may be a control valve. The process control data highway 10 may include one or more wired and/or wireless communication links, and may be implemented using any desired or suitable or communication protocol such as, for example, an Ethernet protocol. In some configurations (not shown), the controller 11 may be communicatively connected to the wireless gateway 35 using one or more communications networks other than the backbone 10, such as by using any number of other wired or wireless communication links that support one or more communication protocols, e.g., Wi-Fi or other IEEE 802.11 compliant wireless local area network protocol, mobile communication protocol (e.g., WiMAX, LTE, or other ITU-R compatible protocol), Bluetooth®, HART®, WirelessHART®, Profibus, FOUNDATION® Fieldbus, etc.

The controller 11, which may be, by way of example, the DeltaV™ controller sold by Emerson Process Management, may operate to implement a batch process or a continuous process using at least some of the field devices 15-22 and 40-46. In an embodiment, in addition to being communicatively connected to the process control data highway 10, the controller 11 is also communicatively connected to at least some of the field devices 15-22 and 40-46 using any desired hardware and software associated with, for example, standard 4-20 mA devices, I/O cards 26, 28, and/or any smart communication protocol such as the FOUNDATION® Fieldbus protocol, the HART® protocol, the WirelessHART® protocol, etc. In FIG. 1, the controller 11, the field devices 15-22 and the I/O cards 26, 28 are wired devices, and the field devices 40-46 are wireless field devices. Of course, the wired field devices 15-22 and wireless field devices 40-46 could conform to any other desired standard(s) or protocols, such as any wired or wireless protocols, including any standards or protocols developed in the future.

The process controller 11 of FIG. 1 includes a processor 30 that implements or oversees one or more process control routines 38 (e.g., that are stored in a memory 32). The processor 30 is configured to communicate with the field devices 15-22 and 40-46 and with other nodes communicatively connected to the controller 11. It should be noted that any control routines or modules described herein may have parts thereof implemented or executed by different controllers or other devices if so desired. Likewise, the control routines or modules 38 described herein which are to be implemented within the process control system 5 may take any form, including software, firmware, hardware, etc. Control routines may be implemented in any desired software format, such as using object oriented programming, ladder logic, sequential function charts, function block diagrams, or using any other software programming language or design paradigm. The control routines 38 may be stored in any desired type of memory 32, such as random access memory (RAM), or read only memory (ROM). Likewise, the control routines 38 may be hard-coded into, for example, one or more EPROMs, EEPROMs, application specific integrated circuits (ASICs), or any other hardware or firmware elements. Thus, the controller 11 may be configured to implement a control strategy or control routine in any desired manner.

The controller 11 implements a control strategy using what are commonly referred to as function blocks, where each function block is an object or other part (e.g., a subroutine) of an overall control routine and operates in conjunction with other function blocks (via communications called links) to implement process control loops within the process control system 5. Control based function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 5. Of course, hybrid and other types of function blocks exist. Function blocks may be stored in and executed by the controller 11, which is typically the case when these function blocks are used for, or are associated with standard 4-20 mA devices and some types of smart field devices such as HART® devices, or may be stored in and implemented by the field devices themselves, which can be the case with FOUNDATION® Fieldbus devices. The controller 11 may include one or more control routines 38 that may implement one or more control loops which are performed by executing one or more of the function blocks.

The wired field devices 15-22 may be any types of devices, such as sensors, valves, transmitters, positioners, etc., while the I/O cards 26 and 28 may be any types of I/O devices conforming to any desired communication or controller protocol. In FIG. 1, the field devices 15-® are standard 4-20 mA devices or HART® devices that communicate over analog lines or combined analog and digital lines to the I/O card 26, while the field devices 19-22 are smart devices, such as FOUNDATION® Fieldbus field devices, that communicate over a digital bus to the I/O card 28 using a FOUNDATION® Fieldbus communications protocol. In some embodiments, though, at least some of the wired field devices 15, 16 and 18-21 and/or at least some of the I/O cards 26, 28 additionally or alternatively communicate with the controller 11 using the process control data highway 10 and/or by using other suitable control system protocols (e.g., Profibus, DeviceNet, Foundation Fieldbus, ControlNet, Modbus, HART, etc.).

In FIG. 1, the wireless field devices 40-46 communicate via a wireless process control communication network 70 using a wireless protocol, such as the WirelessHART® protocol. Such wireless field devices 40-46 may directly communicate with one or more other devices or nodes of the wireless network 70 that are also configured to communicate wirelessly (using the wireless protocol or another wireless protocol, for example). To communicate with one or more other nodes that are not configured to communicate wirelessly, the wireless field devices 40-46 may utilize a wireless gateway 35 connected to the process control data highway 10 or to another process control communications network. The wireless gateway 35 provides access to various wireless devices 40-58 of the wireless communications network 70. In particular, the wireless gateway 35 provides communicative coupling between the wireless devices 40-58, the wired devices 11-28, and/or other nodes or devices of the process control plant 5. For example, the wireless gateway 35 may provide communicative coupling by using the process control data highway 10 and/or by using one or more other communications networks of the process plant 5.

Similar to the wired field devices 15-22, the wireless field devices 40-46 of the wireless network 70 perform physical control functions within the process plant 5, e.g., opening or closing valves, or taking measurements of process parameters. The wireless field devices 40-46, however, are configured to communicate using the wireless protocol of the network 70. As such, the wireless field devices 40-46, the wireless gateway 35, and other wireless nodes 52-58 of the wireless network 70 are producers and consumers of wireless communication packets.

In some configurations of the process plant 5, the wireless network 70 includes non-wireless devices. For example, in FIG. 1, a field device 48 of FIG. 1 is a legacy 4-20 mA device and a field device 50 is a wired HART® device. To communicate within the network 70, the field devices 48 and 50 are connected to the wireless communications network 70 via a wireless adaptor 52a, 52b. The wireless adaptors 52a, 52b support a wireless protocol, such as WirelessHART, and may also support one or more other communication protocols such as Foundation® Fieldbus, PROFIBUS, DeviceNet, etc. Additionally, in some configurations, the wireless network 70 includes one or more network access points 55a, 55b, which may be separate physical devices in wired communication with the wireless gateway 35 or may be provided with the wireless gateway 35 as an integral device. The wireless network 70 may also include one or more routers 58 to forward packets from one wireless device to another wireless device within the wireless communications network 70. In FIG. 1, the wireless devices 40-46 and 52-58 communicate with each other and with the wireless gateway 35 over wireless links 60 of the wireless communications network 70, and/or via the process control data highway 10.

As already noted, the process control system 5 includes an integrated diagnostics system 130, which may execute on a host (sometimes referred to as a "server," "computer," etc.) 150 and may be communicatively coupled to the data highway 10. The host 150 may be any suitable computing device, and may include a memory (not shown) storing the system 130 as one or more modules, applications, or sets of instructions; and a processor (not shown) to execute the system 130. The memory may be any system or device including non-transitory computer readable media for placing, keeping, and/or receiving information (e.g., RAM, ROM, EEPROM, flash memory, optical disc storage, magnetic storage, etc.). In some configurations, the host 150 may be a portable handheld tool, including a touch interface, for example. Further, in some instances, the system 130 is an application-specific integrated circuit (ASIC). While FIG. 1 shows the host 150 as including a display, in some instances the host 150 does not include a display.

The integrated diagnostics system 130 performs online diagnostics, offline diagnostics, and/or an integrated diagnostics analysis on a control valve (as noted, one or more of the field devices 15-22 and 40-46 may be a control valve). As shown, the host 150 provides all of the functionality associated with the system 130. However, in some configurations the integrated diagnostics system 130 is a distributed system. For example, online diagnostics functionality of the diagnostics system 130 may be implemented by a valve controller for a control valve, and the offline diagnostics functionality and integrated diagnostics analysis functionality may be implemented by a host communicatively connected to the data highway 10. In this implementation, the valve controller may transmit collected diagnostics data (e.g., via the I/O card 26 or 28 and the data highway 10) to the host 150 where the integrated diagnostics analysis is performed.

It is noted that although FIG. 1 only illustrates a single controller 11 with a small number of field devices 15-22 and 40-46, wireless gateways 35, wireless adaptors 52, access points 55, routers 58, and wireless process control communications networks 70 included in the example process plant 5, this is only an illustrative and non-limiting embodiment. Any suitable number of controllers 11 may be included in the process control plant or system 5, and any of the controllers 11 may communicate with any number of wired or wireless devices and networks 15-22, 40-46, 35, 52, 55, 58 and 70 to control a process in the plant 5. This system could be integrated as local analytics, edge based analytics, or remote analytics performed in the Cloud.

II. An Example Control Valve that May be Diagnosed and Analyzed by the Integrated Diagnostics System 130

Figure 2:
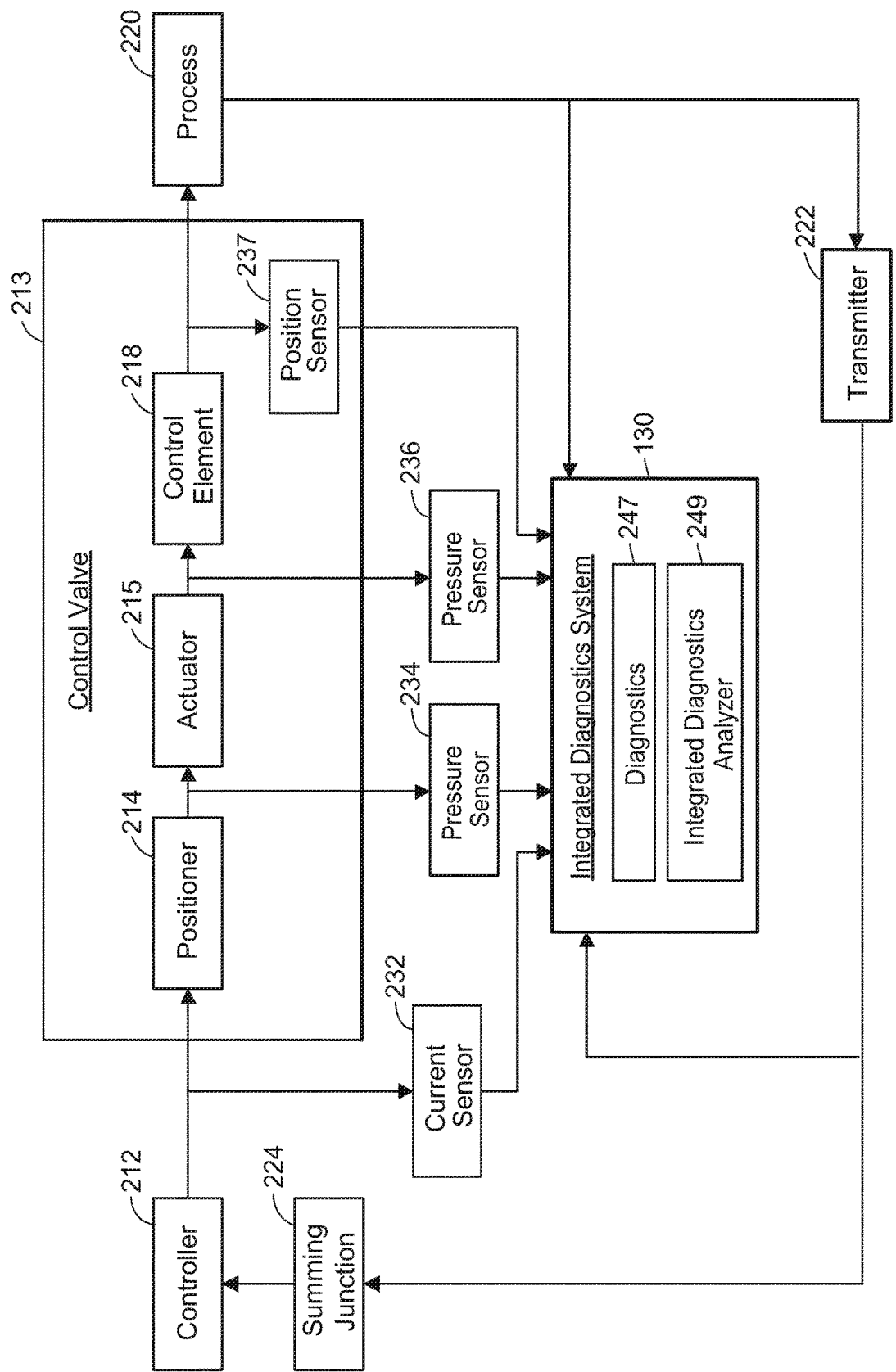
FIG. 2 is a conceptual block diagram depicting an integrated diagnostics system communicatively connected to a control valve, which may operate in the process plant of FIG. 1.

FIG. 2 is a conceptual block diagram depicting the integrated diagnostics system 130 (also shown in FIG. 1) communicatively connected to a control valve 213, which is part of a single-input, single-output process control loop 210. The integrated diagnostics system 130 collects information from the control valve 213 and various sensors, and uses this information to perform online diagnostics, offline diagnostics, and/or an integrated analysis of diagnostics data resulting from the online and offline diagnostics, enabling the integrated diagnostics system 130 to track the behavior and health of the control valve 213. The components of the control loop 210 are described below, followed by a discussion of the system 130 and its interactions with the components of the control loop 210.

In addition to the control valve 213, the control loop 210 includes a transmitter 222, summing junction 224, and a controller 212. The control valve 213 can operate in the plant 5 shown in FIG. 1, and may be similar to one or more of the field devices 15-22 or 40-46. For example, the control valve may be communicatively connected to the data highway 10 via the I/O devices 26 or 28, the controller 11, and/or the gateway 35. In normal operation, the process controller 212 controls the control valve 213 to manipulate a process variable of a process 220. To implement control of the valve 213, the controller 212 sends, for example, a 4 to 20 mA command signal to the control valve 213. The control valve 213 is illustrated as including a positioner 214 (which may be a current-to-pressure (I/P) transducer) that typically sends a 3 to 15 psig pressure signal to a valve actuator 215 (e.g., a pneumatic relay and/or an actuator) which, in turn, pneumatically controls a control element 218 (e.g., a plug) with a pressure signal (air). By adjusting the control element 218, flow through the control valve 213 can be controlled, enabling control of a process variable within the process 220 (e.g., a fluid level in a tank, a flow level in a pipe, a temperature or pressure of a material, etc.).

As is standard, a transmitter 222 measures the process variable of the process 220 and transmits an indication of the measured process variable to a summing junction 224. The summing junction 224 compares the measured value of the process variable (converted into a normalized percentage) to a set point to produce an error signal indicative of the difference. The summing junction 224 then provides the calculated error signal to the process controller 212. The set point, which may be generated by a user, an operator or another controller is typically normalized to be between 0 and 100 percent and indicates the desired value of the process variable. The process controller 212 uses the error signal to generate the command signal according to any desired technique and delivers the command signal to the control valve 213 to thereby effect control of the process variable.

While the control valve 213 is illustrated as including the positioner 214, the actuator 215 and the control element 218, the control valve 213 may include any other type of valve mechanisms or elements instead of or in addition to those illustrated in FIG. 1 including, for example, an electro-pneumatic positioner having an I/P unit integrated therein. As another example, the actuator 215 may be spring-based, and may exert a mechanical force on the control element 218 in response to the pressure signal received from the positioner 214. Additionally, an electro-pneumatic positioner may also integrate an array of one or more sensors, and/or a memory, and/or a parameter estimation unit therein. Furthermore, it should be understood that the control valve 213 may be any other type of device (besides a valve controlling device) that controls a process variable in any other desired or known manner. The control valve 213 may be, for example, a damper, etc.

As noted, the integrated diagnostics system 130 collects data from various devices in the loop 210 and utilizes the collected data to estimate various loop parameters (friction, dead time, dead band, etc.) and to perform online and offline diagnostics. One or more components of the system 130 may be implemented by the host 150 (e.g., a server connected to the various sensors via the data highway 10, a portable tool directly or indirectly connected to the various sensors, etc.). In some configurations, one or more components of the integrated diagnostics system 130 can be internal to the control valve 213 or any other process control device (e.g., field device) in a process control network. If the control valve 213 is a micro-processor based device, the integrated diagnostics system 130 can share the same processor and memory as that already within the control valve 213. Thus, it is contemplated that a statistical analysis (e.g., for the online diagnostics, offline diagnostics, or integrated analysis) may be performed in the device in which the measurements are made (such as in any field device) with the results being sent to a user display or to a host device (e.g., the host 150) for use or, alternatively, the signal measurements may be made by a device (such as a field device) with such measurements then being sent to a remote location (such as the host 150) where the statistical analysis is performed. In any event, regardless of the precise nature of the system 130, it collects via various sensors data pertaining to the valve 213.

For example, the integrated diagnostics system 130 may detect one or more of the command signals delivered to the positioner 214 using a current sensor 232, the pressure output from the positioner 214 using a pressure sensor 234, the actuator command signal output by the actuator 215 using a pressure sensor 236, and the valve position at the output of the control element 218 using a position sensor 237. If desired, the integrated diagnostics system 130 may also or alternatively detect the set point signal, the error signal at the output of the summing junction 224, the process variable, the output of the transmitter 222 or any other signal or phenomena that causes or indicates movement or operation of the control valve 213 or process control loop 210. It should also be noted that other types of process control devices may have other signals or phenomena associated therewith that may be used by the integrated diagnostics system 130.

As will be evident, the integrated diagnostics system 130 may also read an indication of the controller command signal, the pressure signal, the actuator command signal, or the valve position when the control valve 213 is configured to communicate those measurements. Likewise, the integrated diagnostics system 130 may detect signals generated by other sensors already within the control valve 213, such as the valve position indicated by the position sensor 237. Of course, the sensors used by the integrated diagnostics system 130 can be any known sensors and may be either analog or digital sensors. For example, the position sensor 237 may be any desired motion or position measuring device including, for example, a potentiometer, a linear variable differential transformer (LVDT), a rotary variable differential transformer (RVDT), a Hall effect motion sensor, a magneto resistive motion sensor, a variable capacitor motion sensor, etc. It will be understood that, if the sensors are analog sensors, the integrated diagnostics system 130 may include one or more analog-to-digital converters which samples the analog signal and stores the sampled signal in a memory within the integrated diagnostics system 130. However, if the sensors are digital sensors, they may supply digital signals directly to the integrated diagnostics system 130 which may then store those signals in memory in any desired manner. Moreover, if two or more signals are being collected, the integrated diagnostics system 130 may store these signals as components of data points associated with any particular time. For example, each data point at time T1, T2, . . . Tn may have an input command signal component, a pressure signal component, an actuator travel signal component, etc. Of course, these data points or components thereof may be stored in memory in any desired or known manner.

As shown in FIG. 1, the integrated diagnostics system 130 includes a diagnostics module 247 and an integrated diagnostics analyzer 249, each of which may take any desirable form, including software, firmware, hardware, etc. For example, each of the components 247 and 249 may be a module, application, or a set of instructions stored to a memory of a computing device and executable by a processor of the computing device.

The integrated diagnostics system 130 may implement the diagnostics module 247 to perform offline diagnostics on the control valve 213. Generally speaking, during offline diagnostics, the control valve 213 is taken offline. The system 130 then controls the valve 213, driving the throttling element of the valve 213 through its full range of travel. As the valve 213 is opening or closing, the system 130 collects data from one or more of the sensors 232-237 and uses the collected data to generate an offline valve signature (e.g., stored as offline signature data). For example, an offline valve signature can include a set of expected sensor measurements corresponding to a set of respective positions of the valve 213. As a more specific example, the offline valve signature can specify how measurements from the pressure sensor 214 relate to measurements from the position sensor 237, thus relating pressure exerted on the actuator 215 to the position of the actuator 215 and/or to the position of the control element 218.

Further, the integrated diagnostics system 130 may implement the diagnostics module 247 to perform online diagnostics on the control valve 213. During online diagnostics, the system 130 collects data from one or more of the sensors 232-237 and uses the collected data to generate an online valve signature (e.g., stored as online signature data). Similar to an offline valve signature, an online valve signature can include a set of expected sensor measurements corresponding to a set of respective positions of the valve 213. Notably, when performing online diagnostics, the integrated diagnostics system 130 does not require the control valve 213 be taken offline or out of the normal operating environment. Rather, the system 130 collects data while the valve 213 is controlled by the controller 212 during normal online operation. As a result, the online valve signature may correlated sensor measurements to valve positions over a more limited range. For example, unlike an offline signature which may relate sensor measurements to valve positions for a range of 0% open to 100% open, an online signature may relate sensor measurements to valve positions for a range that it typically experiences during normal online operation, such as 40% open to 60% open.

The system 130 in general may implement the integrated diagnostics analyzer 249 to analyze an current operating data, an online valve signature, and offline valve signature, and may rely on that analysis to estimate a behavior or health of the valve. Example techniques that may be implemented by the analyzer 249 are discussed below with reference to FIGS. 5 and 6.

III. An Example Valve Controller that can Implement Diagnostics Functions

Figure 3:
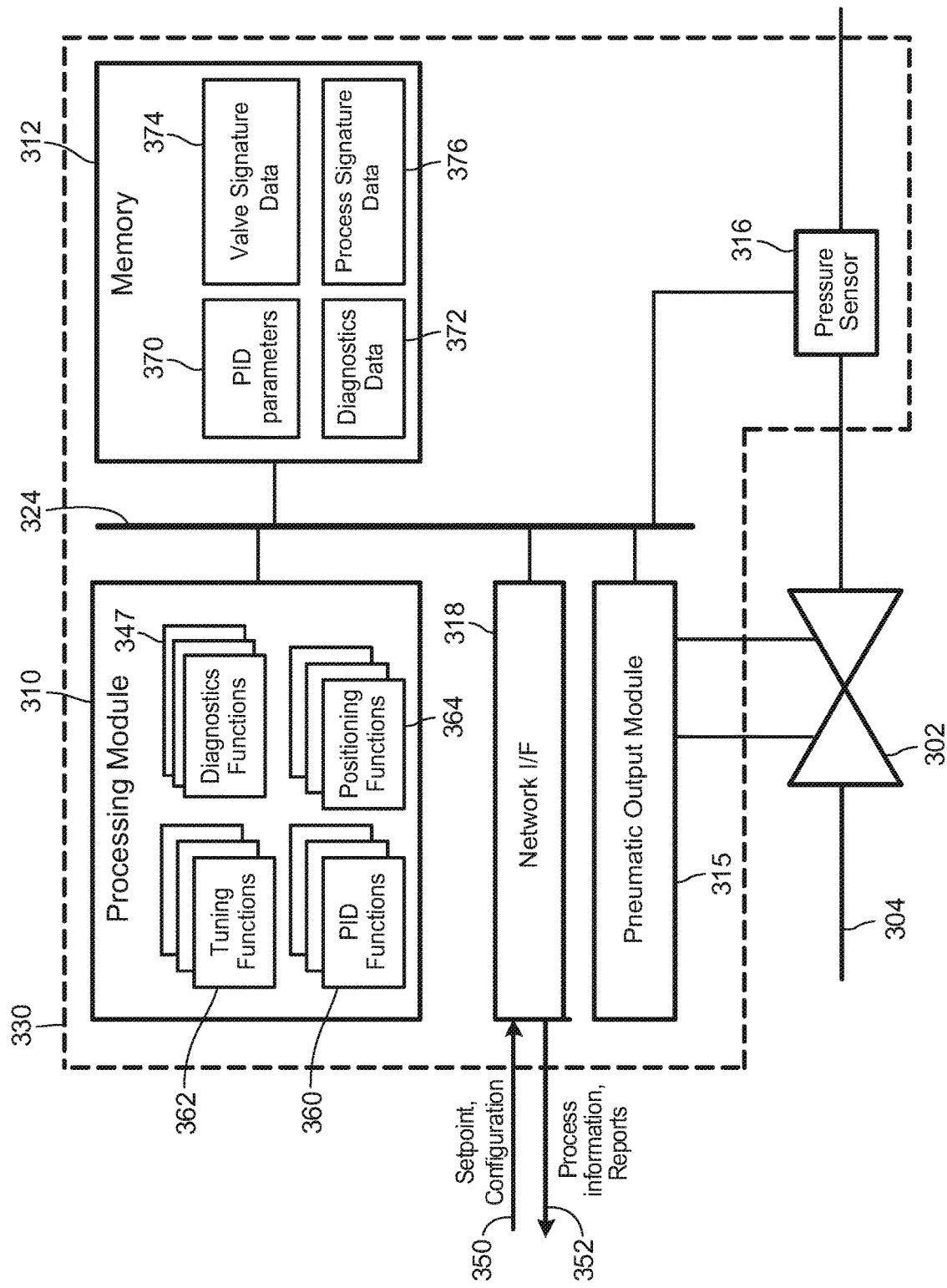
FIG. 3 illustrates an example digital valve controller capable of controlling a valve and implementing diagnostics functions used by the integrated diagnostics system.

FIG. 3 illustrates an example digital valve controller (for simplicity, "controller") 300 capable of controlling a valve 302 and implementing diagnostics functions 347, which may be similar to the diagnostics module 247 shown in FIG. 2. The valve 302 and controller 300 may be referred to as a "smart valve" or "smart field device," and may be similar to one or more of the field devices 15-22 or 40-46 shown in FIG. 1. The controller 300 may be communicatively connected to the data highway 10 shown in FIG. 1 via the I/O devices 26 or 28, the controller 11, and/or the gateway 35.

As discussed below, the controller 300 is capable of fast, dynamic in situ process control for various types of process variables, performance optimization, real-time diagnostics, etc. By implementing PID control directly at a valve or another field device, the controller 300 can deliver improved loop performance. Moreover, the controller 300 effectively replaces several devices, thereby simplifying installation and maintenance. A single supplier can provide the controller 300 for total loop control.

In the example configuration of FIG. 3, the controller 300 operates on the valve 302, which is installed in a pipeline 304. The valve 302 and the pipeline 304 can be similar to the valve 213 discussed above with reference to FIG. 2. The controller 300 includes function modules 310, a memory 312 and a pneumatic output module 314 (which may be similar to the actuator 215 shown in FIG. 2). In some implementations, the controller 300 also can include a sensor, such as a pressure sensor 316. Further, the integrated controller 300 can include a network interface module 318. In an example implementation, the components 300-322 are coupled to a backplane 324. The controller 300 can receive a setpoint for a process variable and configuration data via a communication line 350, and provide process information and reports to a remote host via a communication line 352. The lines 350 and 352 are not necessarily physically separate channels, and in general can be communication channels on a same wire or a set of wires, different radio channels or different timeslots of a same channel, or any other suitable types of physical or logic channels. The lines 350 and 352 may be communicatively connected to a data highway, such as the data highway 10 shown in FIG. 1.

Next, the components 310-324 are briefly considered individually, followed by a discussion of operation of the controller 300.

Depending on the implementation, the function modules 310 can include a general-purpose central processing unit (CPU) configured to execute instructions stored in the memory 312 and/or one or several special-purpose modules, such as application-specific integrated circuits (ASICs) configured to execute PID functions. The CPU can include a real-time clock accurate to within a certain number of minutes (e.g., 10) per year over the entire range of temperatures at which the controller 300 can operate. More generally, the function modules 310 can include one or more processors of any suitable type. As schematically illustrated in FIG. 3, the function modules 310 can implement one or several PID functions 360, one or several tuning functions 362, one or several real-time positioning functions 364, the online diagnostics module 247 discussed with reference to FIG. 2, and, if desired, additional functions related to monitoring, troubleshooting, process variability optimization, etc. The function modules 310 can implement these functions in hardware, firmware, software instructions executable by one or more processors, or any suitable combination of hardware, firmware, and software.

In an example scenario, the function modules 310 receives a pressure setpoint via a communication line 350 for the pipeline 304 from a remote host via the network interface 318, receives sensor data from the pressure sensor 316, executes a PID algorithm to generate a positioning command (or, more generally, an output signal), and applies the positioning command to the valve 302 via the pneumatic output module 314. It is noted that the function modules 310 can receive a setpoint for a process variable rather than for a field device. The function modules 310 can retrieve the tuning parameters for the PID loop from the memory 312. These parameters can be pre-configured, received from a remote host, determined and/or adjusted used auto-tuning, etc., as discussed in more detail below. Thus, the function module 310 can use locally collected sensor data to locally, without relying on a remote host, execute control functions. Depending on the implementations, the function modules 310 can implement functions to control many different process variables, such as pressure, position, temperature, flow rate, or pH.

More generally, the function modules 310 allow the integrated controller 300 to quickly and efficiently react to device issues (e.g., detect a problem with the valve 302, detect failure of the sensor 316), control loop issues (e.g., determine that PID parameters should be adjusted), carry out emergency procedures (e.g., shut down flow through the pipeline 304), generate alerts for output via the local UI module 322 and/or for reporting to a remote host.

The memory 312 can be any suitable non-transitory computer-readable medium and can include volatile and/or non-volatile components. Thus, the memory 312 can include random-access memory (RAM), a hard disk, a flash drive, or any other suitable memory components. The memory 312 can store PID parameters 370, online diagnostics data 372, valve signature data 374, and process signature data 376. In particular, the PID parameters 370 can specify proportional, derivate, and integral gain values for a loop controlling the valve 302 or another field device. The PID parameters 370 can be provided configured by a remote operator via a remote host and provided via the network interface 318, a local operator via the UI module 322, pre-stored in the memory 312 by the manufacturer of the integrated controller 300, etc. In some scenarios, the integrated controller 300 can adjust PID parameters 370 in response to receiving a new setpoint 350 or upon conducting diagnostics, for example.

The valve signature data 374 and the process signature data 376 can describe expected behavior of the valve 302 and the loop for controlling the valve 302, respectively. Generally speaking, signatures stored in the memory 312 can describe the expected response of a sub-system to input signals, for comparing to the actual response of the sub-system and determining whether the sub-system operates properly. The signatures stored in the memory 312 may include online signatures such as those described with reference to FIG. 2.

The integrated controller 300 can locally collect data for determining the actual response to a sub-system such as the valve 302 and again locally compare the collected data to the signature 374, the signature 376, or another signature. In this manner, the integrated controller can quickly and efficiently detect valve problems (e.g., actuator being stuck, pressure loss, leakage of fluid), process upsets, control loop degradation, etc. Further, if desired, the integrated controller 300 can execute the appropriate tuning function 362 to create a process signature. Using the process signature, the controller can detect a suitable set of tuning parameters for the desired control loop response.

Further, the memory 312 can retain configuration information, logs, history data, status of input and output ports, etc. The integrated process controller 300 can be configured to retain in the memory 312 an event log, an alert log, real-time clock data, a loop log, historical data, database data, status of input/output channels, function module attributes, user lists, etc., in the event of a power failure.

With continued reference to FIG. 3, the pneumatic output module 314 can actuate the valve 302 during operation. The pneumatic output module 314 can include an I/P transducer and one or more relay components. In an example implementation, the pneumatic output module 314 includes an I/P module and a double-acting relay. Further, in one implementation, the pneumatic output module 314 includes a relay that bleeds and one that locks in the last value in the event of a power failure. The controller 300 can provide indications of output pressure of the pneumatic output module 314 via the local UI 322 or the RUI of a remote host. It is noted that the controller 300 can monitor operation of the pneumatic output module 314 by sensing output pressure, for example, and perform real-time online diagnostics to detect complete or partial failure early.

When used in applications in which natural gas is the medium, the controller 300 can include one or several no-bleed pneumatic components to comply with emission regulations. The controller 300 in these implementations allows continued use of the medium while reducing the emissions compared to traditional pneumatic devices.

In an example implementation, the pressure sensor 316 is an integral pressure sensor module configured to measure pressure as the process variable (PV). The pressure sensor 116 may bolt directly to the housing 330. In alternative implementations, however, the pressure sensor 316 can be provided as a separate device coupled to the controller 300 by a wired link or a short-range wireless link. Similar to the pneumatic output module 314 discussed above, the controller 300 can display live data for the pressure sensor 316 via a local UI module (not shown) or the RUI at the remote host. Further, the controller 300 can support commands using which an operator can request, or pull, live data via the local or remote interface.

Although the example implementation depicted in FIG. 3 includes a pressure sensor 316 integral with the remaining assembly of the controller 300, in other implementations the controller 300 can include additional I/O modules such as a valve position sensor or a temperature sensor. These and other modules can be inserted into the backplane 324, or the controller 300 can communicate with the additional modules via short-range communication links.

The network interface module 318 can support general-purpose protocols such as the Internet Protocol (IP) as well as special-purpose process control and industrial automation protocols designed to convey commands and parameters for controlling a process plant, such as Modbus, HART, Profibus, etc. The network interface module 318 can support wired and/or wireless communications. As discussed above, the controller 300 can receive a setpoint value from a remote host via a long-range communication link to which the network interface module 388 is coupled. The network interface module 318 can support Ethernet ports and, in some implementations, implement protection against unauthorized access.

The backplane 324 can be a component with no active circuitry, residing in the housing 330 and having connections for mounting various modules. As illustrated in FIG. 3, the backplane 324 can interconnect the function modules 310, the memory 312, the network interface 318, the pneumatic output module 314, etc. The backplane 324 in general can include connections to receive power, select lines, communication ports, etc. In some implementations, the CPU module is selected or designed so as to prevent mis-insertion into the backplane 324.

In operation, the controller 300 can perform real-time prognostics to allow operators to quickly gain accurate insight into process changes, issues related to the valve 302, transmissions and communications, control maintenance, etc. Thus, the controller 300 can carry out control functions in the field. In other words, rather than operating based on commands generated by a remote host that implements a PID loop, the controller 300 can control the valve 302 and/or loop parameters locally and, if desired, report information to a host via a communication network via the communication line 352.

Further, although the controller 300 can receive the setpoint value 350 via a wireless communication link, which may introduce a communication delay, the controller 300 then can drive the process variable to the setpoint using wired signaling between components within the same devices, or even on-chip signaling. More specifically, the controller 300 need not report pressure, position, temperature, level, flow rate, or other measurements to another device capable of calculating new control signals. Updates to the setpoint therefore may be limited by the speed of wireless communications, but communications between sensors, modules calculating proportional, derivate, and integral values, etc. occur at higher speeds.

IV. Example Plots that May be Generated and Analyzed by the Integrated Diagnostics System 130

Figure 4:
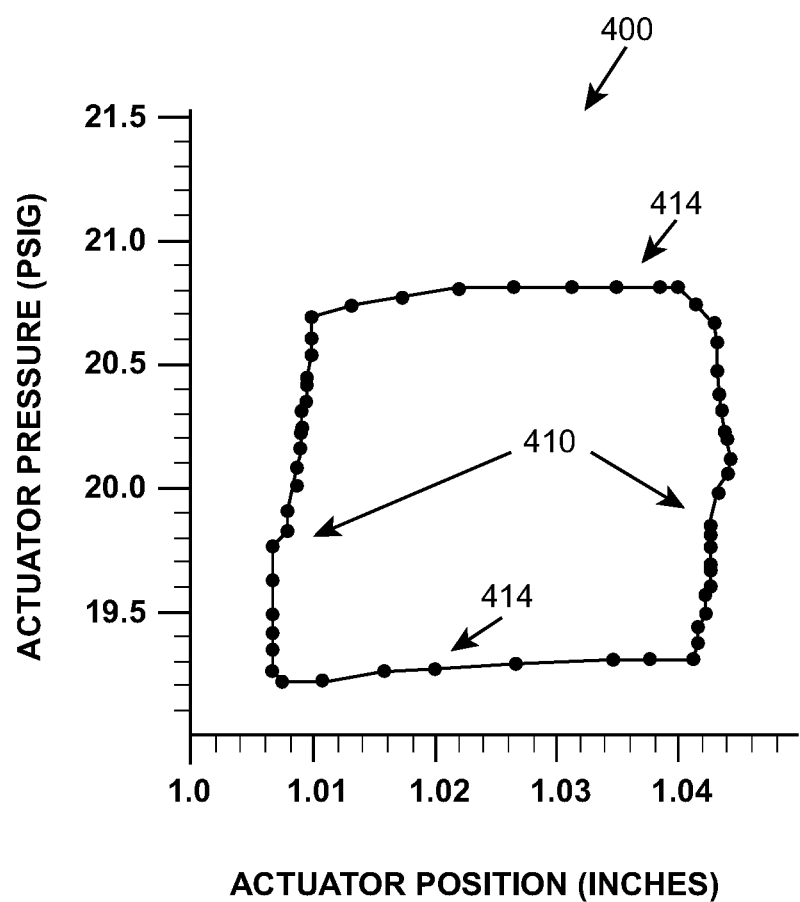
FIG. 4 illustrates an example plot of actuator pressure versus valve position for a typical sliding stem valve, generated by an integrated diagnostics system performing online diagnostics.

FIG. 4 illustrates an example plot 400 of actuator pressure versus valve position for a typical sliding stem valve, generated by the integrated diagnostics system 130 performing online diagnostics. The plot 400 may also be referred to as an online valve signature. Each point in the plot 400 corresponds to a concurrent measurement obtained by the integrated diagnostics system 130 of pressure exerted on the actuator 215 shown in FIG. 2 (i.e., "actuator pressure") and a position of the actuator 215 or control element 218 shown in FIG. 2 (i.e., "valve position"). While the plot 400 is discussed with reference to the valve 213 shown in FIG. 2, it may be implemented with respect to any suitable valve.

The plot 400 corresponds to a single cycle of operation of the valve 213. This single cycle of operation may be referred to as an "online signature" for the valve 213. The system 130 may collect multiple online signatures. In some instances, the system 130 may generate an online signature based on a full cycle, a partial cycle (e.g., representing a trend across two data points, three data points, etc.), or may generate an online signature based on multiple cycles, representing an average cycle over a given period of time or a certain number of cycles, rather than a single cycle (e.g., the online signature may be a rolling average of the past ten online signatures).

Those of ordinary skill in the art will appreciate that upon a reversal of direction by the valve 213, the control element 218 operates through a friction zone in which the applied pressure increases or decreases a significant amount with little or no resulting movement of the control element 218. This friction zone, which is caused by friction within the valve 213, is generally indicated by the more vertical lines 410 in FIG. 4. Upon exiting the friction zone, the control element 218 then moves a significant amount with relatively little change in the applied pressure. This operation is generally indicated by the more horizontal lines 414 in FIG. 4. Of course, other methods of representing the relationship between actuator pressure and actuator or control element position are also available. For example, actuator pressure and actuator position can be plotted separately versus time. By aligning the two resulting plots along the same timeline, the plots can be simultaneously analyzed to detect the amount of pressure required to enable the movement of the actuator 215 and/or control element 218. Thus, one of ordinary skill in the art will appreciate that the exemplary plots discussed herein are presented by way of illustration only.

Figure 5:
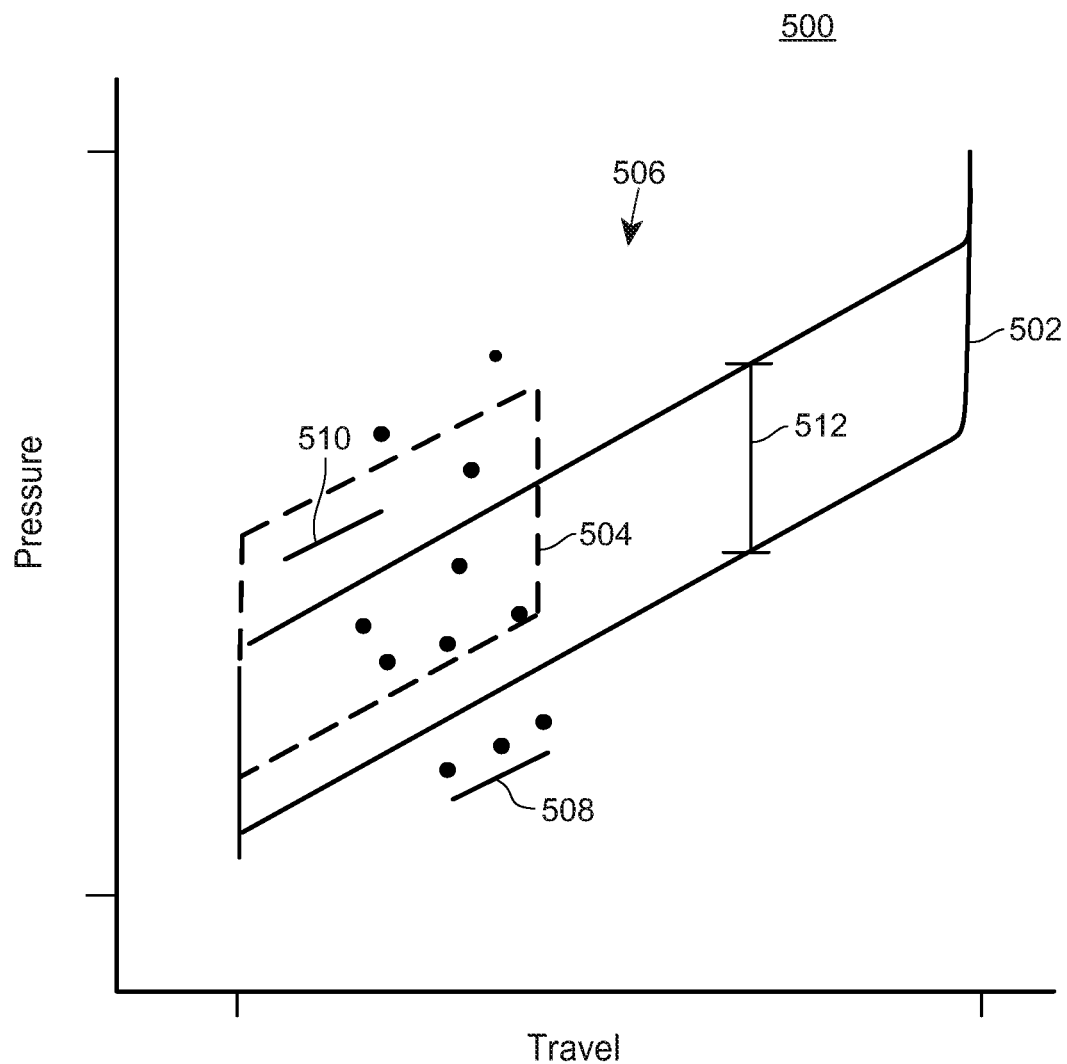
FIG. 5 illustrates an example plot of actuator pressure versus valve position, generated by an integrated diagnostics system performing an integrated diagnostics analysis that utilizes both online and offline diagnostics.

FIG. 5 illustrates an example plot 500 of actuator pressure versus valve position, generated by the integrated diagnostics system 130 performing an integrated diagnostics analysis that utilizes both online and offline diagnostics. The plot 500 includes an offline signature 502, an online signature 504, data points 506, trend lines 508 and 510, and a measurement 512 of a diagnostic metric.

The offline signature 502 is generated by taking the valve offline, controlling the valve through a full range of travel, and collecting data over time pertaining to pressure exerted on a valve actuator compared to travel or position of the control element of the valve. In other words, the system 103 collects data so that at multiple discreet points in time, pressure can be compared to valve position. Because the valve is typically taken through a full range of motion during offline diagnostics testing, these relationships can be observed for the full range of the valve. Utilizing the collected data, the system 130 can generate the offline valve signature 502. In short, this represents the typical behavior of the valve when the valve is being stroked. Depending on the embodiment, the offline signature may be based on a partial cycle (e.g., 0% to 100% open, but not vice versa), a full cycle, or multiple cycles (e.g., representing an average of the multiple cycles).

The online diagnostics signature 504 may be similar to the online signature discussed with reference to FIG. 4. In short, the system 130 generates the online signature by observing the valve operate over time under normal operating conditions. In contrast to the offline signature, which is usually generated based on data collected while the valve moves through a full range of travel, the online signature is often generated based on data collected while the valve moves through a more limited range of travel because the valve may be configured to typically only move through that limited range of travel during normal operation.

The plot 500 further includes current data points 506. Generally speaking, the system 130 collects the current data points 506 during normal operation of the valve and utilizes the current data points 506 to generate or identify an online valve signature such as the signature 504. In some instances, the current data points 506 may be compared to previous online valve signatures. For example, FIG. 5 shows data points 506 above the signature 504, indicating that, for the valve positions associated with these data points 506, the valve required more pressure than expected or observed based on the online signature 504. Similarly, the plot 500 shows three data points 506 below the online signature 504, indicating that at certain points the valve required less pressure for a given position.

Finally, the plot 500 includes trend lines 508 and 510 that are generated by the system 130 from the current data points 506. The system 130 can generate the trend lines 508 and 510 and analyze these lines to evaluate the health of the valve. In some instances, the trend lines 508 and 510 may be part of an online valve signature, or may themselves represent an online valve signature (in this case, an incomplete valve signature).

The trend lines 510 and 508 can be compared to the online signature 504 and offline signature 502 to evaluate the health of the valve. Because the trend lines 510 and 508 can be compared to both an online signature and offline signature, the system 103 can better evaluate the health of the valve when compared to other diagnostic systems.

For example, if one were to compare the trend line 510 to the offline signature 502 alone (something often done in typical diagnostic evaluations), one would observe that an excessive amount of pressure is required to move the valve to a given position (relative to the offline signature), and might thus conclude that the valve is behaving in an abnormal manner. Similarly, one could compare the trend line 510 to the online signature 504 alone and conclude that the valve is requiring less pressure to move, and might consequently conclude that the valve is behaving abnormally. However, an analysis of the trend line 510 in light of the signature 502 and signature 504 reveals that, for a given valve position, the valve actuator requires pressure within an expected range when both the online signature 504 and offline signature 502 are considered.

The plot 500 also shows a measurement 512 of a diagnostic metric. This particular metric is a pressure differential that reveals the size of the friction zone associated with the valve. In short, the measurement 512 is of a difference between: (i) a pressure measured for a valve position as the valve is opening, and (ii) a pressure measured for that same valve position as the valve is closing. The measurement 512 reveals a level of friction associated with the valve. As already noted with reference to FIG. 4, a valve operates through a friction zone in which the applied pressure increases or decreases a significant amount with little or no resulting movement of the valve. This friction zone, which is caused by friction within the valve, is generally indicated by the more vertical lines of the offline signature 502 and the online signature 504. Upon exiting the friction zone, the valve then moves a significant amount with relatively little change in the applied pressure. This zone of easier movement is represented by the more horizontal lines of the offline signature 502 and the online signature 504. The measurement 512 reveals the size of the friction zone.

The integrated diagnostics system 130 can identify, from the data points 506, a current friction zone measurement (not show), which can be compared to the measurement 512 and/or to a measurement of a friction zone associated with the online signature 504. Thus, the integrated diagnostics system 130 can determine whether the current friction zone is near the friction zone of the signatures 502 and 504. Further, the system 130 can monitor the friction zone over time to determine whether the friction zone is increasing or decreasing (either of which may indicate a problem with the health of the valve), and a rate at which the friction zone is increasing or decreasing.

The integrated diagnostics system 130 can similarly observe other diagnostic metrics. For example, the integrated diagnostics system 130 can monitor the slope of the more horizontal lines of the offline signature 502, the offline signature 504, and/or trends 508 and 510. This slope generally correlates to a spring rate associated with the valve. Thus, the system 130 can monitor these slopes and determine whether the slope is increasing or decreasing over time (which, again, may indicate a problem with the health of the valve).

V. An Example Method of Performing Integrated Diagnostics Analysis

Figure 6:
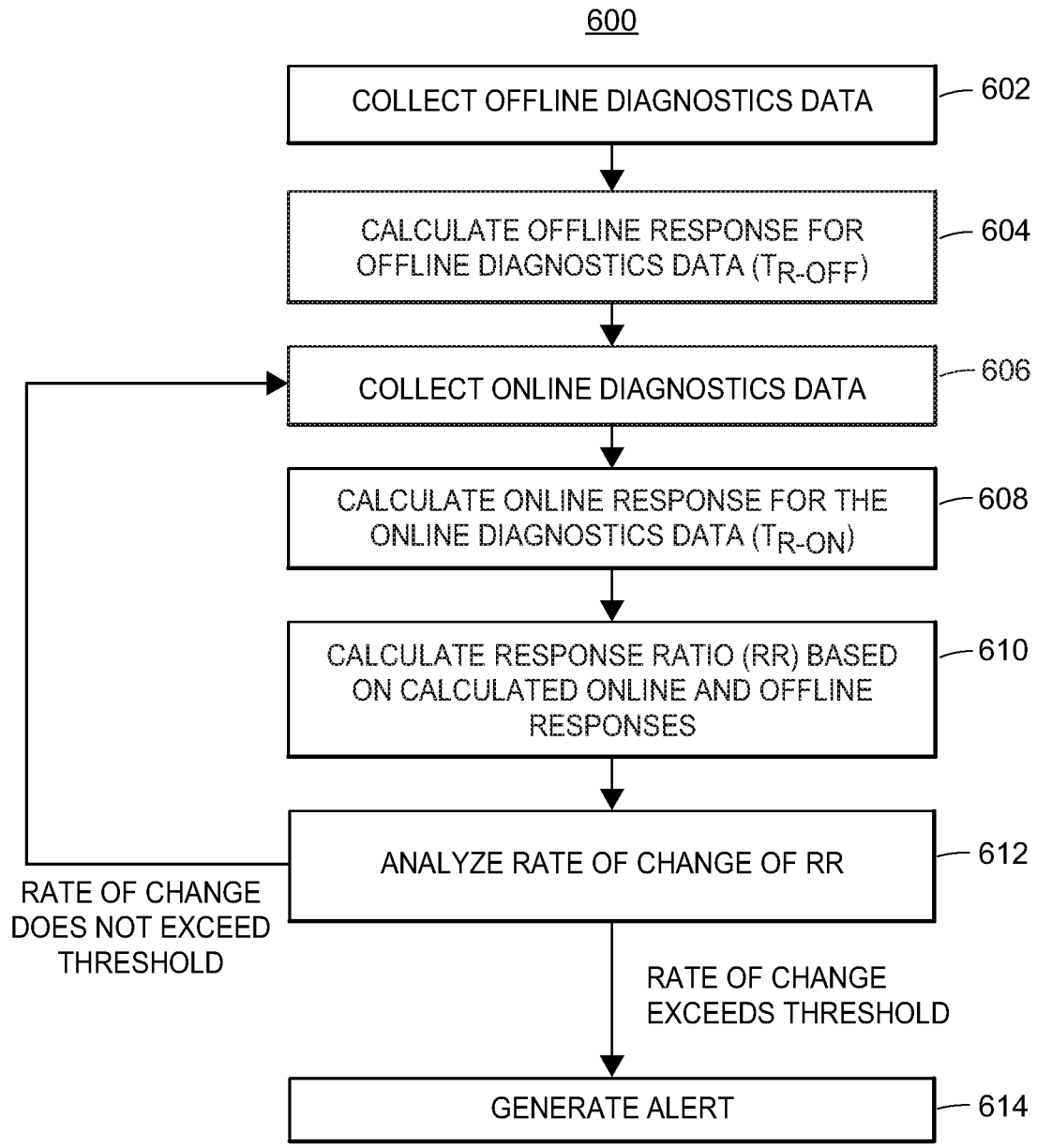
FIG. 6 is a flow chart depicting an example method of performing an integrated diagnostics analysis, which can be implemented in the integrated diagnostics system of FIG. 2.

FIG. 6 is a flow chart depicting an example method 600 of performing integrated diagnostics analysis. The method 600 may be implemented, in whole or in part, by the integrated diagnostics system 130 shown in FIG. 1. Software instructions that implement the method 600 may be saved in a non-transitory, computer-readable memory. While the method 600 is discussed with reference to the valve 213 shown in FIG. 2, in general the method 600 can be applied to any suitable valve.

The method 600 can be implemented to evaluate the stability of a valve over time. In short, offline and online behaviors of the valve are observed and compared to each other. This relationship is observed over time. The system 130 can generate an alarm when the relationship begins to change, indicating that the behavior of the valve is beginning to change when compared to historic performance.

At block 602, the system 130 collects offline diagnostics data. As already noted, this generally involves taking the valve 213 offline, stroking the valve 213 through its entire range of travel, and collecting (e.g., via the sensors 232-237) diagnostics data as the valve 213 is moving. In some instances, the diagnostics data includes a timestamp generated by a clock (e.g., an internal hardware or software clock of the host 150 shown in FIG. 1 or of the valve controller 300 shown in FIG. 3). Once this diagnostics data has been collected, the system 130 can generate an offline signature such as the signature 502 shown in FIG. 5.

At block 604, the system 130 calculates an offline response from the offline diagnostics data and/or offline signature ($T_{R-OFF}$). In short, the offline response represents a response by an output variable (e.g., the valve 213 in this case) to a change in an input variable during offline diagnostics testing. Generally speaking, the input variable is the pressure applied to the actuator 215 or the pressure applied by actuator 215 to the control element 218, and the output variable is the response time (e.g., the time it takes for the control element 218 to move and reach a steady state). In some instances, the output variable is the position at which the control element 218 reaches at steady state (e.g., 60% open) after responding to the change in the input variable. In some configurations, the input variable could be the 4-20 command received by the positioner 214.

At block 606, the system 130 collects online diagnostics data. The online diagnostics data is data collected (e.g., via one or more of the sensors 232-237) during online operation of the valve 213. While the online diagnostics data is being collected, the controller 212 typically controls the valve 213 as it normally would to implement the control logic of the process 220.

At block 608, the system 130 calculates an online response from the online diagnostics data ($T_{R-ON}$). Generally speaking, the online response represents a response by an output variable (e.g., the valve 213 in this case) to an input variable during online operation. Like the offline response, the online response may relate a response of any given output variable (e.g., measured by one of the sensors 234-237) to a manipulation of any other input variable (e.g., measured by one of the sensors 232-236 and/or a clock). That said, the input and output variables utilized for the calculated online response are generally the same input and output variables that were utilized when calculating the offline response. For example, if the offline response utilizes as an input variable a pressure signal applied on the actuator 215 and utilizes as an output variable the position of the control element 218 (as measured by the sensor 237) responding to changes in the pressure signal, the online response similarly utilizes the pressure signal and control element position as the input variable and output variable, respectively.

At block 610, the system 130 calculates a response ratio based on the calculated online and offline responses (e.g., $T_{R-ON}/T_{R-OFF}$). For example, if during online operation the valve 213 takes three seconds to respond to a given pressure applied to the actuator 215 and the offline signature indicates that the valve 213 took two seconds to respond to that same pressure, the response ratio is 1.5 (3/2). Alternatively, if the valve takes two seconds to respond to the given pressure, the response ratio is 1 (2/2).

Generally speaking, the response ratio indicates how closely the online behavior of the valve 213 mimics the behavior of the valve 213 observed during offline diagnostics testing. In some instances, it is expected that online performance of the valve differs from performance during offline diagnostics testing. This could be caused by a number of factors, such as wear and tear on the valve since offline diagnostics testing was performed, changes in process conditions, changes in environmental conditions, etc. Consequently, a response ratio value greater or less than one does not necessarily suggest the valve is experiencing a problem.

At block 612, the system 130 analyzes the rate-of-change of the response ratio over time. For example, the system 130 may estimate a line of best fit by evaluating the response ratio value for each of the last ten online responses that have been calculated. With reference to the previous example, the last ten online response might be (3, 3, 3, 3, 3.1, 3.2, 3.3, 3.7, 4, 4.5), meaning the corresponding values for the response ratio would be (1.5, 1.5, 1.5, 1.5, 1.55, 1.6, 1.65, 1.85, 2, 2.25). As can be seen, the response ratio is relative stable for the first five or six samples, but then progressively increases over the last five or six samples. This could indicate the behavior of the valve is becoming unstable, suggesting a potential problem with the valve.

As noted above, it is sometimes expected that online performance of the valve differs from offline performance. The system 130 can account for this expected difference in online and offline behavior by observing the trend of the response ratio over time. This trend or rate of change indicates whether the relationship between the offline response and the online response remains stable over time. That is, the offline and online responses may differ, but so long as the response ratio between the two remains relatively stable, the valve is likely in good condition. Said another way, a small or nonexistent rate of change of the response ratio indicates that the monitored valve 213 is exhibiting relatively consistent behavior over time. For example, a rate of change near zero may indicate that, relative to past performance, the valve 213 is opening or closing to expected positions in an expected amount of time in response to a given pressure exerted on the actuator 215. Thus, when the rate of change does not exceed a threshold, which may be any suitable value (e.g., 2), the system 130 continues collecting online data (block 606).

However, if the rate of change of the response ratio exceeds a threshold (e.g., 2), this indicates that the valve is deviating further and further from past performance. Consequently, if the rate of change exceeds a threshold, an alarm is generated (block 614). Depending on the configuration, the alarm can be visual or audible in nature. The alarm can be displayed or sounded at an operator display, a display for a valve controller, etc.

VI. Additional Remarks

Unless specifically stated otherwise, discussions herein using words such as "processing," "computing," "calculating," "determining," "identifying," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

When implemented in software, any of the described applications, services, engines, routines, and modules may be stored in any tangible, non-transitory computer readable memory such as on a magnetic disk, a laser disk, solid state memory device, molecular memory storage device, an optical disk, or other storage medium, in a RAM or ROM of a computer or processor, etc. Although some example systems are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, persons of ordinary skill in the art will readily appreciate that the examples provided are not the only way to implement such systems.

What is claimed is:

1. A method comprising:
   actuating a control valve via a first control signal;
   receiving, by one or more processors, offline diagnostics data for the control valve, the offline diagnostics data describing a first relationship between pressure and valve position observed during a response of the control valve to the first control signal for a first range of travel when the control valve is not in service in a process plant;
   calculating an offline response of the control valve utilizing the offline diagnostics data;
   actuating the control valve via a plurality of control signals;
   receiving, by the one or more processors, online diagnostics data for the control valve, the online diagnostics data describing a plurality of relationships between pressure and valve position observed during a plurality of responses of the control valve to the plurality of control signals for one or more ranges of travel, each less than the first range of travel, when the control valve is in service in the process plant;
calculating a plurality of online responses for the control valve utilizing the online diagnostics data;
for each of the plurality of online responses, calculating a value for a response ratio relating the offline response to one of the plurality of online responses such that each online response has a corresponding value for the response ratio;
analyzing the values of the response ratio to determine a rate of change for the response ratio over time; and
determining that the rate of change for the response ratio exceeds a threshold value; and in response to determining that the rate of change for the response ratio exceeds the threshold value, generating an indication to be provided to an operator via a user interface.

2. The method of claim 1, wherein the offline diagnostics data represents an offline signature and wherein the online diagnostics data represents an online signature.

3. The method of claim 2, wherein the offline signature and the online signature each relate pressure measurements to valve position measurements,
wherein the pressure measurements are measurements of pressure applied to an actuator of the control valve and the valve position measurements are measurements of the control valve's position after responding to the applied pressure.

4. The method of claim 1, wherein the one or more processors include a processor of a portable handheld tool.

5. The method of claim 1, wherein the diagnostic metric is a differential in pressure measurements corresponding to valve friction, the pressure measurements being (i) measurements of pressure applied to an actuator of the control valve or (ii) measurements of pressure applied to a control element of the control valve.

6. The method of claim 1, wherein the diagnostic metric is a slope corresponding to a spring rate.

7. A system comprising:
a control valve in a process plant;
a plurality of sensors configured to monitor the control valve; and
an integrated diagnostics system communicatively connected to the plurality of sensors, the diagnostics system configured to: receive, via the plurality of sensors, offline diagnostics data for the control valve, the offline diagnostics data describing a first relationship between pressure and valve position observed during a response of the control valve to a first control signal for a first range of travel when the control valve is not in service in the process plant;
calculate an offline response of the control valve utilizing the offline diagnostics data;
receive, via the plurality of sensors, online diagnostics data for the control valve, the online diagnostics data describing a plurality of relationships between pressure and valve position observed during a plurality of responses of the control valve to a plurality of control signals for one or more ranges of travel, each less than the first range of travel, when the control valve is in service in the process plant;
calculate a plurality of online responses for the control valve utilizing the online diagnostics data; for each of the plurality of online responses, calculate a value for a response ratio relating the offline response to one of the plurality of online responses such that each online response has a corresponding value for the response ratio;
analyze the values of the response ratio to determine a rate of change for the response ratio over time;
and determine that the rate of change for the response ratio exceeds a threshold value;
and generate, in response to determining that the rate of change for the response ratio exceeds the threshold value, an indication to be provided to an operator via a user interface.

8. The system of claim 7, wherein the integrated diagnostics system is implemented by one or more of the following:
a server communicatively connected to the plurality of sensors and a controller configured to control the control valve;
a digital valve controller configured to control the control valve; and
a portable handheld tool configured to wireless communicate with one or more of the server and the digital valve controller.

9. The system of claim 7, wherein the plurality of sensors includes:
a pressure sensor monitoring: (i) a pressure applied on an actuator of the control valve, or (ii) a pressure applied on a control element of the control valve; and
a position sensor monitoring a position of the control element of the control valve.

10. The system of claim 7, wherein the offline diagnostics data and the online diagnostics data each include: (i) pressure measurements obtained by the pressure sensor, and (ii) position measurements obtained by the position sensor, each position measurement corresponding to one of the pressure measurements.

11. The system of claim 7, further including a clock, wherein the integrated diagnostics system is further configured to timestamp the offline diagnostics data when received and to timestamp the online diagnostics data when received.

12. The system of claim 11, wherein the offline diagnostics data and the online diagnostics data each include: (i) pressure measurements obtained by the pressure sensor, and (ii) response times calculated using the clock, wherein each of the response times represents a time it took the control valve to reach a steady state after responding to one of the pressure measurements.

13. The system of claim 7, wherein the plurality of sensors includes:
an electrical sensor monitoring a current signal received by the control valve; and
a position sensor monitoring a position of the control valve.

14. A method comprising:
initiating an offline diagnostics procedure on a control valve in a process plant, wherein the control valve is controlled through a first range of travel;
collecting, during the offline diagnostics procedure, offline diagnostics data from a plurality of sensors monitoring the control valve;
calculating an offline response of the control valve utilizing the offline diagnostics data;
collecting, during online operation of the control valve during which the control valve is controlled through one or more ranges of travel each less than the first range of travel, online diagnostics data from the plurality of sensors monitoring the control valve;

calculating a plurality of online responses for the control valve utilizing the online diagnostics data;

for each of the plurality of online responses, calculating a value for a response ratio relating the offline response to one of the plurality of online responses;

analyzing the values of the response ratio to determine a rate of change for the response ratio over time; and generating an indication to be provided to an operator via a user interface when the rate of change for the response ratio exceeds a threshold.

15. The method of claim 14, wherein calculating the offline response and calculating the plurality of online responses all comprise:

calculating a position of the control valve as a function of a pressure asserted on a control element or an actuator of the control valve.

16. The method of claim 14, wherein calculating the offline response and calculating the plurality of online responses all comprise:

calculating a response time of the control valve as a function of a pressure asserted on a control element or an actuator of the control valve.

17. The method of claim 1, further comprising: in response to determining that the rate of change for the response ratio exceeds the threshold value, close the control valve.

18. The system of claim 7, wherein the diagnostic system is further configured to close the control valve in response to determining that the rate of change for the response ratio exceeds the threshold value.

* * * * *

UNITED STATES PATENT AND TRADEMARK OFFICE
CERTIFICATE OF CORRECTION

PATENT NO. : 11,275,365 B2  
APPLICATION NO. : 15/454800  
DATED : March 15, 2022  
INVENTOR(S) : Shawn W. Anderson Page 1 of 2

It is certified that error appears in the above-identified patent and that said Letters Patent is hereby corrected as shown below:

On the Title Page

At page 2, in Column 1, item (56), under "OTHER PUBLICATIONS", Line 7, "Applicatoin" should be -- Application --.

In the Specification

At Column 5, Line 50, "FIGS." should be -- FIGs. --.

At Column 7, Line 43, "15-®" should be -- 15-18 --.

At Column 8, Lines 28-29, "WirelessHART," should be -- WirelessHART® protocol, --.

At Column 11, Line 44, "to" should be -- in --.

At Column 12, Line 9, "be" should be -- to be --.

At Column 12, Line 13, "correlated" should be -- correlate --.

At Column 12, Line 21, "an current" should be -- current --.

At Column 12, Line 26, "FIGS." should be -- FIGs. --.

At Column 13, Line 39, "used" should be -- using --.

At Column 18, Line 3, "show)," should be -- shown), --.

At Column 19, Line 53, "response" should be -- responses --.

At Column 19, Line 56, "relative" should be -- relatively --.

Signed and Sealed this  
Thirty-first Day of October, 2023

Katherine Kelly Vidal  
*Director of the United States Patent and Trademark Office*

In the Claims

At Column 22, Line 21, "wireless" should be -- wirelessly --.